Oct. 26, 1965 W. T. CARDWELL, JR 3,213,757

DOUBLE BIPOLAR PHOTOSCULPTURE

Original Filed Feb. 13, 1961 5 Sheets-Sheet 1

INVENTOR.
WILLIAM T. CARDWELL, JR.

BY Walter J. Madden, Jr.
ATTORNEY

*INVENTOR.*
WILLIAM T. CARDWELL, JR.
*BY* Walter J. Madden, Jr.
ATTORNEY

Oct. 26, 1965 W. T. CARDWELL, JR 3,213,757

DOUBLE BIPOLAR PHOTOSCULPTURE

Original Filed Feb. 13, 1961 5 Sheets-Sheet 3

*INVENTOR.*
WILLIAM T. CARDWELL, JR.

*BY* Walter L. Madden, Jr.
ATTORNEY

Oct. 26, 1965 W. T. CARDWELL, JR 3,213,757

DOUBLE BIPOLAR PHOTOSCULPTURE

Original Filed Feb. 13, 1961 5 Sheets-Sheet 4

INVENTOR.
WILLIAM T. CARDWELL, JR.
BY
Walter J. Madden, Jr.

Oct. 26, 1965 W. T. CARDWELL, JR 3,213,757

DOUBLE BIPOLAR PHOTOSCULPTURE

Original Filed Feb. 13, 1961 5 Sheets-Sheet 5

INVENTOR.
WILLIAM T. CARDWELL, JR.
BY Walter J. Madden, Jr.
ATTORNEY 3,213,757
Patented Oct. 26, 1965

3,213,757

DOUBLE BIPOLAR PHOTOSCULPTURE

William T. Cardwell, Jr., 16731 Ardita Drive, Whittier, Calif.

Filed Mar. 23, 1964, Ser. No. 354,824
19 Claims. (Cl. 90—13)

The present application is a continuation of Serial No. 89,039, filed February 13, 1961, and now abandoned.

This invention pertains to the art of photosculpture, the carving of three-dimensional images out of solid materials, using information originally collected in two-dimensional form on photographs. It applies to artistic portraiture in three dimensions, and also to industrial pattern or die making. The invention applies to any art in which it is desired to make a three-dimensional solid image or model of an original three-dimensional prototype.

The idea of using photographs as an aid in the carving of three-dimensional images is old, perhaps as old as photography itself. A sculptor, Francois Wilhelme, is said to have experimented in photosculpture in 1861, using 28 cameras ("Photosculpture," Jacob Deschin, Popular Photography, Aug. 1950, p. 76). Around the turn of the present century, movie cameras began to be used in photosculpture, and the modern tendency still seems to be toward experimentation with movie cameras. The shape of the prototype is recorded with a movie camera, while the prototype and the camera move with respect to each other. The present invention returns to the use of the still camera, which has some significant theoretical and practical advantages over the movie camera for accurate photosculptural purposes; most importantly, it is instantaneous, so that the object does not have to be held stationary during several seconds of recording, and secondly it avoids the need to register sequential frames.

The first patent known to the present inventor relevant to the type of photosculpture comprehended in the present invention is that of John Hammond Smith, U.S. 891,013, June 16, 1908. Smith projected the image of a grid onto the surface of the prototype and photographed the resulting distorted grid with one or more still cameras off the axis of the projector. He developed each negative, put it back in the camera in which it was taken and changed each camera into a projector. He replaced the prototype with a moldable or carvable material such as clay. Then he projected the same grid image onto the material to be shaped that he had projected onto the prototype, the projection being made from the same position in space. He also projected one or more of the photographed images onto the material to be shaped, the projections being made from the same positions from which the photographs were taken. Finally, he worked the material toward the shape of the desired three-dimensional image, judging his progress by the degree of coincidence of the original grid pattern projected onto the prototype with the photographed image of the same grid pattern projected back onto the prototype. When the two images coincided over the entire surface of the three-dimensional image, Smith knew that the shape of that image must be the same as the shape of the prototype.

Smith's method was theoretically accurate, but it was obviously not a direct carving method. It was rather a checking process for telling when the three-dimensional image carved or molded by hand had attained similarity to the prototype.

More closely related to the method of the present invention was the method of H. M. Edmunds, described in U.S. Patents 1,485,493 issued Mar. 4, 1924; 1,615,261 issued Jan. 25, 1927; and 1,716,768 issued June 11, 1929. The Edmunds method, in one of its forms, made use of a rectangular grid projected onto the prototype. A photograph was taken of the projected grid from a position off the axis of the projector, from which position the lines of the grid appeared displaced out of rectangularity by the nonplanar surface of the prototype, just as in the prior Smith method. However, in the Edmunds method, the photograph of the displaced grid lines was used as a guide plate in a machine that directly carved a block of material into a three-dimensional image of the prototype.

One of the principal differences between the Edmunds method and the method to be described in the present specification is that in the Edmunds method the information recorded on the so-called guide plate was used in a machine that, in effect, converted that information into a Cartesian co-ordinate form. The motions inside the carving machine were made by members whose natural motions were perpendicular to each other, and for which the natural three-dimensional co-ordinates of motion were Cartesian co-ordinates. The conversion of the information into Cartesian co-ordinates was necessarily approximate, and to keep down the error of approximation it was necessary to keep the projector and the camera at large distances from the object. As Edmunds said in U.S. 1,716,768, p. 4, lines 15 et seq.: "It is obvious that . . . the less the divergence of the rays from the projector lens, the less will be the error due to lateral distortion; that is to say, the further from the object the projector is placed (the camera at the same time being placed an approximately equal distance from the object), the less will be this lateral distortion of the finished figure." It can probably be appreciated by the reader of the present specification, without review of further details of the Edmunds method that if projectors and cameras must be moved away from the object in order to diminish distortion, a compromise is being made between distortion and insensitivity. Obviously, the sensitivity of a method of photosculpture (as measured, for instance, by the separation of two points on the recorded photographic image compared to the spatial separation of the corresponding actual points on the prototype) must decrease as the camera is moved away from the prototype.

One important difference then between the method of the present specification and prior art methods as typified by the Edmunds method is that the present method makes no compromise between distortion and insensitivity. The method avoids entirely any approximations that would be involved in converting the photographic information into Cartesian form. The method makes use of a theoretical principle not perceived by previous photosculptors; that is, that the natural system of co-ordinates for photosculpture is a bipolar co-ordinate system. The photographic information is naturally obtained in a bipolar form, for instance with rays of light emanating from the optical center of a projector lens (one pole) and rays of light being collected through the optical center of a camera lens (the other pole). Although it may not be obvious until it is pointed out, the natural co-ordinate system for making use of the collected photographic information is another bipolar system. The present specification shows how such use may be made with no theoretical approximations whatsoever. In this system there is no need to move a projector or a camera away from the object whose shape is being recorded to decrease distortion. There is no distortion, either in theory or in actual practice. The projector (or its equivalent, a point source of light) may be brought very close to the object, and the camera likewise may be brought very close, thereby giving the method the maximum theoretical sensitivity.

One object of the present invention is to provide a theoretically exact method of photosculpture that is, at the same time, simpler than previous methods, because in the carving steps it uses the same natural co-ordinate system that was used in the recording step. The invention comprises a carving system that is, in some senses, the mechanical analog of the optical recording system. Some of the mechanical members occupy spatial positions corresponding to the spatial positions of parts of the recording system. Some of the mechanical motions of the carving tool occur along directions traveled by light rays in the recording system.

Another object of the present invention is to provide a method of photosculpture in which the photographic information from which the three-dimensional image is to be produced can be obtained in one or two, or no more than a few, conventional still photographs.

Another object of the invention is to provide a method of photosculpture in which any arbitrary accuracy of the sculptured image may be attained without the use of advanced optical, electromechanical, or electronic equipment.

These and other objects will become apparent in the light of the following detailed description, and in view of the accompanying drawings, in which.

Figure 1:
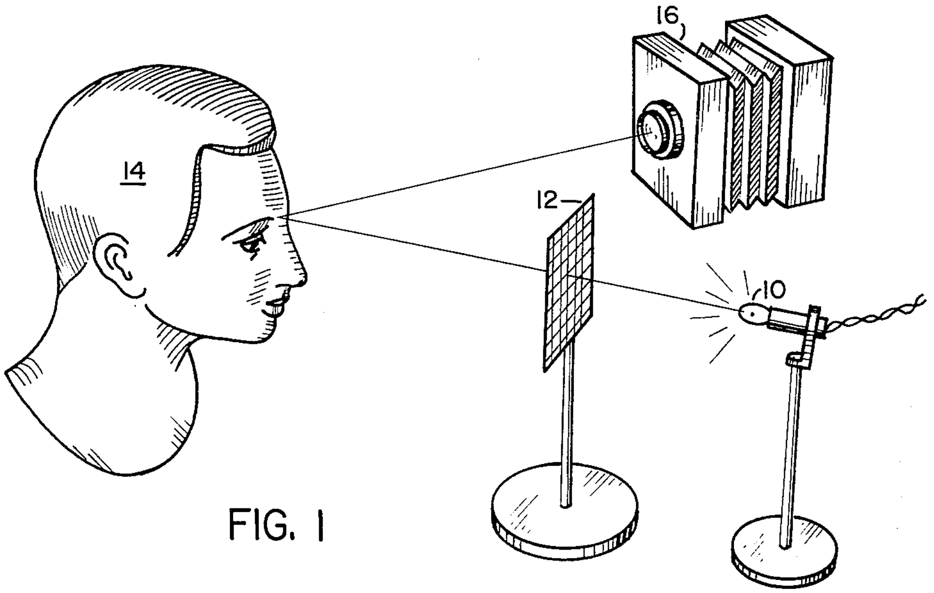
FIGURE 1 is a perspective view of the essential elements for making a photographic record to use in the process.
Figure 2:
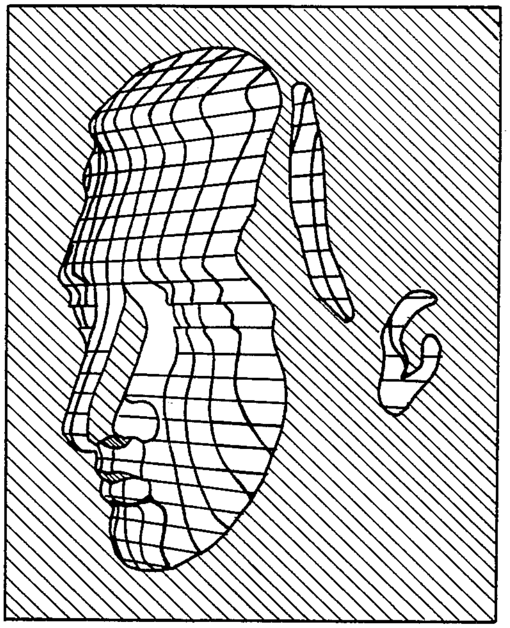
FIGURE 2 is a simplified version of a photographic record of the type used in the process.

Refer first to FIGURE 1, in which reference numeral 10 represents a point source of light, 12 is a mostly transparent rectangle crossed by opaque grid lines that are projected upon the surface of the prototype 14, which in this case is a human face. The camera 16 records the appearance of the face with the grid projected upon it as indicated in FIGURE 2. To this point the method is quite similar to many previous methods of photosculpture, the most notable one being the very early one of John Smith, U.S. Patent 891,013 issued June 16, 1908. Smith and many others since him employed a projector with a grid inside it rather than the point light source indicated in FIGURE 1, but this was partly because convenient point sources have only recently become available. One such source, which I have used, is a "concentrated arc lamp" manufactured by Central Scientific Company. The effective diameter of this light source is 0.003 inch. The point source of light is not only a practical convenience; it has definite didactic advantages in explaining the method. However, it should be remarked that even present day point sources have their limitations and that high wattage sources are not available with small effective source diameters; so for recording the shapes of larger objects, for instance the full-length human figure, it is still of advantage to use a projector to cast a grid onto the object. When a projector is used, the effective optical center (or emergent nodal point) of the projector lens system takes the spatial position of the point light source mentioned in the following description.

The result of the operation indicated in FIGURE 1 is a photograph containing information of the type shown in FIGURE 2. The curvatures of the vertical grid line shadows tell how the prototype surface curves in space. It will be appreciated also that the grid line shadows, and particularly the shadows of the grid line intersections, serve to identify the meeting points of certain light rays with the prototype surface. Each grid line intersection shadow on the prototype can be connected by a straight line going back through the proper grid line intersection itself to the point source. Therefore, each grid line intersection can be said to represent an identifiable light ray in space. To be very exact, of course, a grid line intersection shadow actually represents the absence of a light ray, but for practical purposes it is convenient to use terminology in which a grid line intersection is said to represent an identifiable light ray.

In the description thus far, one significant distinction from some of the prior art methods has been, in a sense, a distinction of omission. It has not been necessary to specify any particularly desirable relationship between the size of the prototype and the distances from the point light source to the prototype and from the prototype to the camera. The distances do not need to be large compared with the effective diameter of the prototype. As a matter of fact it is desirable not to make them large. The method is exact in theory no matter what are those distances, and the sensitivity of the method is greater the smaller the distances. In practice, when the prototype is a human face, I have found it advantageous to place the point source and the camera at distances of the order of 20 inches from the prototype.

Figure 3A:
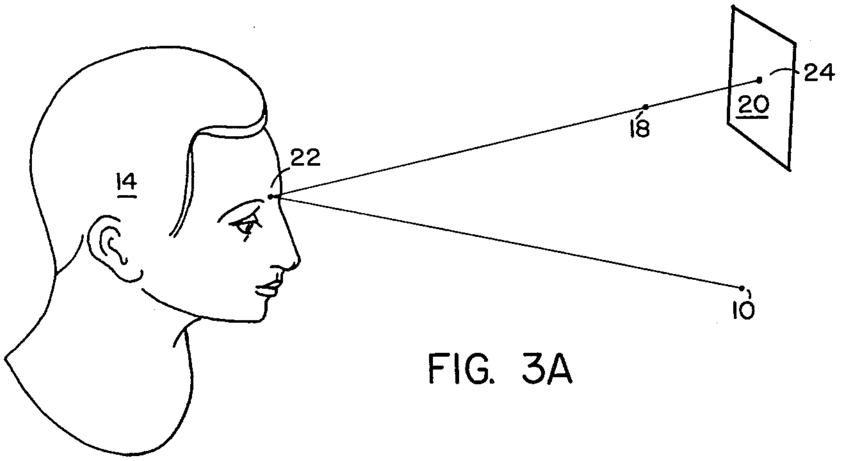
FIGURES 3A and 3B are schematic, perspective diagrams showing how the carving, or shaping, process (FIGURE 3B) is geometrically related to the recording process (FIGURE 3A).
Figure 3B:
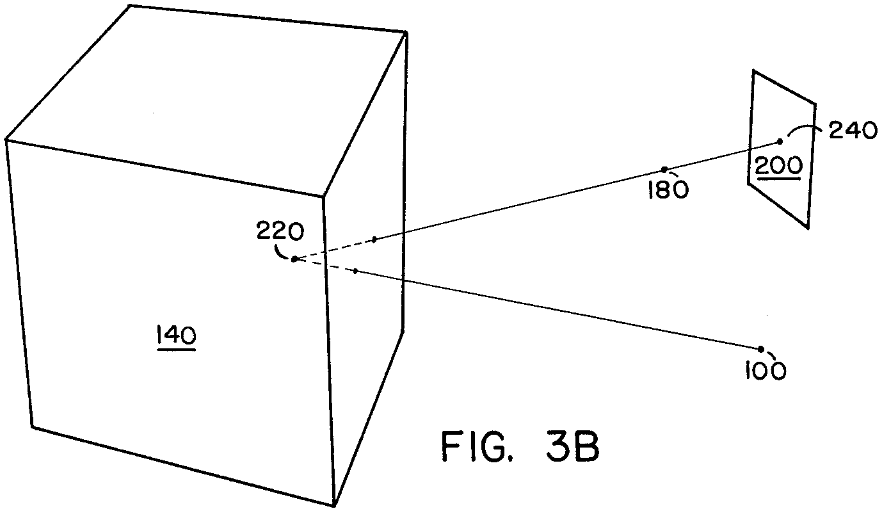

Now, in order to explain the principles of the rest of the method, it is convenient to establish a special terminology, and in order to do this, it is convenient to refer to the schematic diagrams, FIGURES 3A and 3B. These represent the two systems—FIGURE 3A, the recording system, and FIGURE 3B, the carving system—in their barest essentials. In FIGURE 3A, reference numeral 10 represents what we shall call the source point. The source point represents either the spatial position of a point light source or the spatial position of the optical center of a projector lens system. In either case light rays are considered to proceed from, or through, the source point onto the prototype 14. A particular light ray is indicated in FIGURE 3A that proceeds from the source point onto the prototype. It is convenient to call the point 22, at which that particular light ray meets the prototype, the meeting point corresponding to that light ray. In FIGURE 3A, a third important spatial point 18 is represented, which we shall call the sighting point. The sighting point would usually be the effective optical center of a camera lens system. It could also be, for instance, the pinhole of a pinhole camera. In FIGURE 3A, a particular light ray is indicated that proceeds from the meeting point 22 through the sighting point 18 onto the recording medium 20, which would usually be a photographic film. The point 24 at which the particular ray in FIGURE 3A encounters the film 20 is, of course, an indication of the spatial direction from which the light ray came through the sighting point 18 from the meeting point 22.

Now consider FIGURE 3B which is intended to represent schematically the geometry of the carving system. The most important part of this entire explanation to appreciate is that the geometry, or the spatial configuration, of the carving system is similar to that of the recording system. There are spatial points in the carving system corresponding exactly to the source point, the meeting point, and the sighting point in the recording system, and when a distortionless image is to be carved, the relative directions between these points in the carving system are identical to the relative directions between the corresponding points in the recording system. When a life-sized, or one-to-one scaled, image is to be produced, not only the relative directions, but also the distances between corresponding points are identical.

One of the important ideas in the present invention is that the carving tool, which could be a drill or milling tool, could proceed into the block of material to be carved along the direction that was previously taken by a light ray proceeding from the source point onto the prototype. It is most convenient, for purposes of explanation, to think of the carving tool as a drill, and it will be so mentioned hereinafter, but it should be understood that the carving tool might be any one of a number of kinds of milling, or grinding, or routing, tools in obvious modifications of the method. Considering the carving tool to be a drill proceeding into the block along its own axis of rotation, if the axial direction is to be the same as that of a light ray, it is sufficient that the drill motor be attached to a sliding shaft having the same axis as the drill and that the axis of the shaft be constrained to pass always through a single point in space that may be called the tool axis constraining point. In FIGURE 3B the tool axis constraining point 100 is shown, corresponding to the source point 10.

For convenience in the explanation, corresponding points in FIGURES 3A and 3B are numbered similarly, the corresponding number in FIGURE 3B being the number in FIGURE 3A with a zero added. Number 100 corresponds to 10, 140 corresponds to 14, etc.

In FIGURE 3B, another spatial point is indicated that corresponds to the sighting point 18. This is the guiding point 180. The spatial configuration of the entire carving system is such that the positions of the block 140, the tool axis constraining point 100, and the guiding point 180 correspond respectively to the prior positions in the recording system of the prototype, the source point, and the sighting point.

The drill proceeds into the block 140 to a terminal point 220, which is, by definition, a point such that the direction from itself to the guiding point is the same as the recorded direction of the prior light ray proceeding through the sighting point from the meeting point produced by the light ray along whose direction the drill is traveling. Various ways of stopping the drill at a terminal point so defined will be described hereinafter.

At this point, it may be appreciated by the reader that if any type of carving machine is set up that incorporates the features thus far described only in abstraction, a tool axis constraining point and a guiding point, and if the machine holds a block of material so that the spatial relationships correspond to the spatial relationships in the prior recording system, and if the machine controls the depth of penetration of the carving tool as indicated above, the terminal points in the block will lie on a surface in space similar in shape to the original surface of the prototype. If, as indicated throughout most of this specification, the carving tool is merely a drill, a large number of holes may be drilled into the block with close spacing, and the block may then be smoothed off to a new surface defined by the bottom of the drilled holes. This will produce the desired three-dimensional image of the prototype. Of course, the closer and finer the drilled holes, the finer the detail on the finished image.

The principles of the method have now been explained in an abstract form that applies to various machines. Certain specific machines for carrying out the method will now be described. First, a machine will be described that is perhaps the simplest possible one incorporating the principles of the method. Then, more complicated machines will be described whose added complexities are for the purpose of making those machines more convenient to use.

Figure 4:
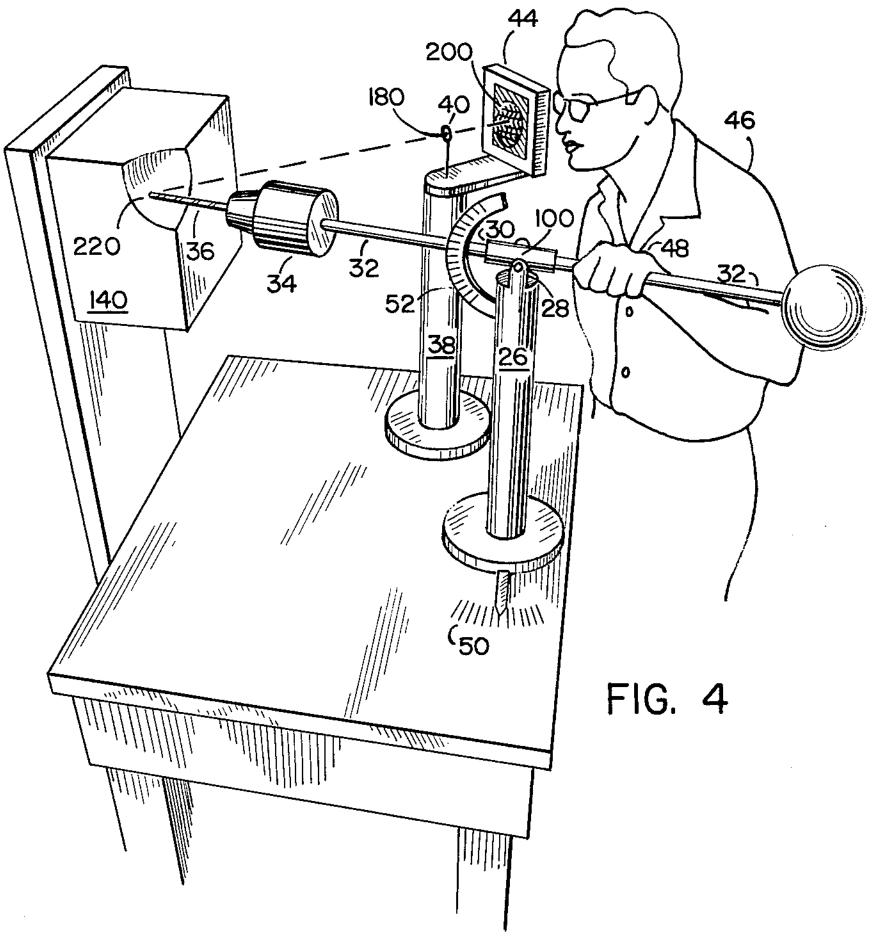
FIGURE 4 is a perspective view of a simple machine that could make use of some of the principles of the described method.

Refer to the machine pictured in FIGURE 4. The first thing to notice about the machine is that it incorporates the geometrical features already discussed. At the top of column 26 there is a yoke 28 in which is suspended a sleeve 30 that serves as a sliding bearing for the shaft 32. The sleeve 30 can rotate about a horizontal axis perpendicular to the axis of the shaft 32. The shaft 32 can be pointed in an infinite number of directions in space, by rotating the entire column 26 to change the azimuth, and by rotating the sleeve 30 to change the elevation. The shaft 32 can also be slid forward and backward along its axis, thereby advancing and retracting the drill motor 34 and its attached drill 36. However, during all possible motions of the shaft 32, its axis is constrained to pass through the fixed point 100, which is recognizable as the tool axis constraining point of the description hereinbefore.

Attached to the column 38 is a small peephole 40, the center of which is considered to be the point 180, recognizable as the guiding point of description hereinbefore. In accordance with the previously described principles, the block 140 of material to be carved is set up so that the spatial positions of the block, the tool axis constraining point 100, and the guiding point 180 correspond respectively to the positions of a prototype, a source point, and a sighting point in a prior recording system.

The developed photographic negative 200 from the prior recording system is placed in the holder 44 so that it occupies the same position with respect to the other components of the carving system that the original, unexposed photographic negative in the camera occupied with respect to the corresponding components of the recording system. (For convenience in the drawing of FIGURE 4, the negative is shown as if it were a positive, the general background being light, and being crossed by dark lines of the transformed grid.)

The operator 46 can look through the negative, on through the peephole 40, toward the end of the drill at point 220. He can move the drill forward and backward, in and out of the block, by moving the shaft 32 with his hand 48. The operator can also turn the column 26 to give the drill axis any desired azimuth as measured on scale 50. He can also give the drill axis any desired elevation as measured on scale 52.

Now, if the operator gives the drill axis a certain azimuth and a certain elevation corresponding to a certain identified light ray in the prior recording system, and if he looks through the particular point in the negative 200 upon which is recorded the image of the meeting point of that certain identified light ray, and if he moves the drill forward until its end as seen through peephole 40 is in line with that particular point on the negative, the drill will be at the proper position to form one point on the surface of an image of the prototype. The operator can, of course, repeat this procedure for as many identifiable rays as he pleases in order to define the surface of the image as accurately as he pleases.

Although the system described in FIGURE 4 is capable of carrying out the basic method of this invention, there is an obvious difficulty in using the system. In general, it is impossible to see the end of the drill 36 when it is penetrating the block 140. In order to carry out the method as described above, it is necessary to cut away, with some auxiliary cutting device, the material blocking the view of the end of the drill, and this must be done progressively as the drill proceeds. This makes a cut-and-try process out of this otherwise direct photo-sculpture process.

A less serious difficulty with the system of FIGURE 4 is the mere inconvenience of sighting through the negative, through the peephole, on to the end of the drill.

Figure 5:
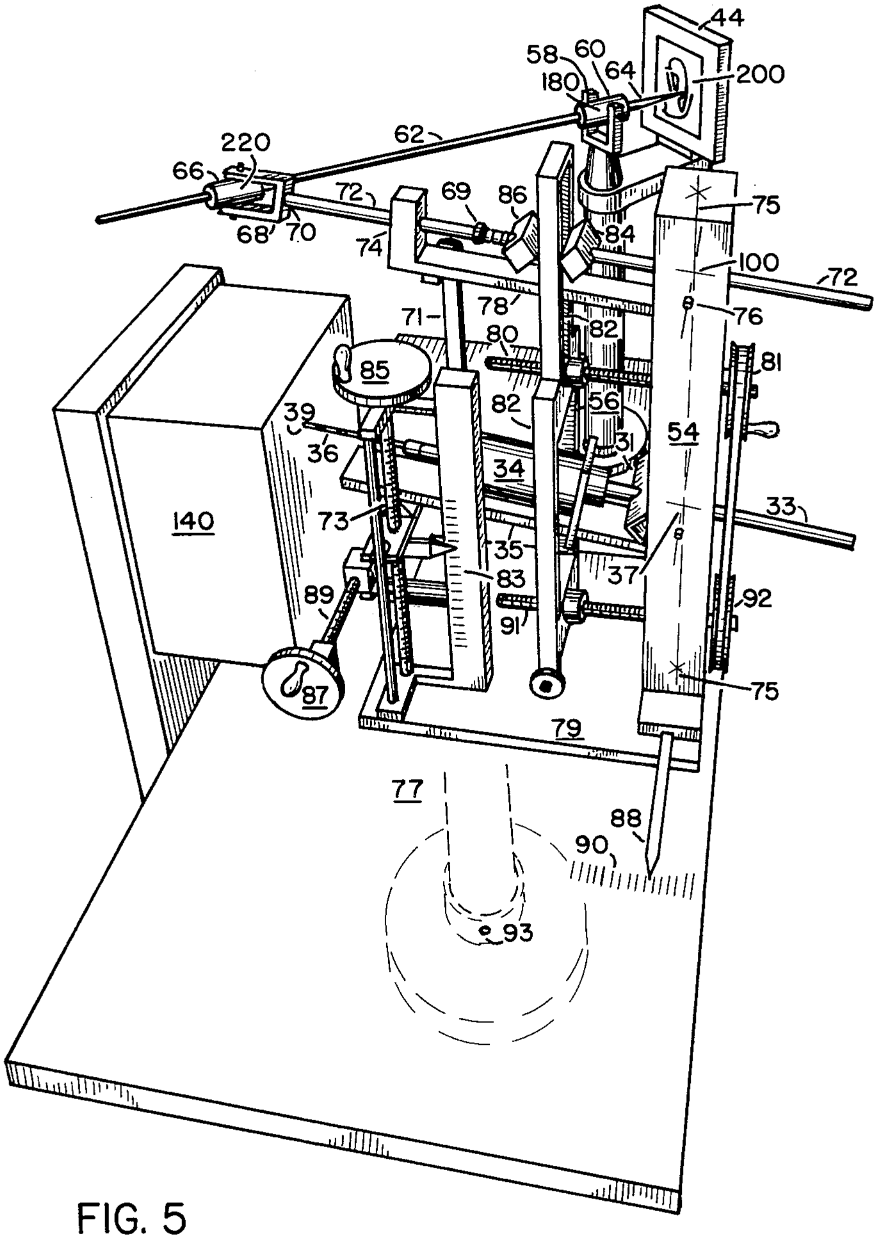
FIGURE 5 is a perspective view of a somewhat more complicated machine capable of carrying out the method conveniently and exactly (the machine with which the method has actually been carried out to date).

Both of the above difficulties are overcome in the more complicated system shown in FIGURE 5.

The machine represented in FIGURE 5 can be used for direct carving. It can be used in several ways, the simplest way involving the drilling of a large number of holes to the proper depth in the block to be carved. The drilled-up part of the block may then be removed down to the hole bottoms thereby bringing out the shape of the prototype. The same machine is capable of a continuous type of carving along continuous curved lines in the block to be carved. However, the simpler, drilling type of operation will be described first.

One first sets the direction in which the tool points into the block to be carved. One does this by turning the azimuth wheel 87, and the elevation wheel 85. The azimuth of the tool direction is indicated on scale 90 and the elevation on scale 83. Then one sets the limiting depth to which the tool can penetrate the block by turning depth wheel 81. The proper depth is set when the depth wheel 81 is so turned that the pointer 64 points to the proper line on the photographic record 200. The proper line is one of the curved, generally vertical lines like those shown in FIGURE 2. It is specified when the azimuth is specified. The azimuth, elevation, and limiting depth being set, one then merely pushes the carving tool forward into the block by shoving forward on shaft handle 33 until the forward motion is stopped by stopper bar 82.

The operations of the preceding paragraph are repeated as many times as necessary to achieve the accuracy of reproduction desired. I have found that the gross form of a human face can be reproduced in accurate proportion with a few hundred drilled holes. To bring out detailed features requires a few thousand holes, or the equivalent of a few thousand holes in a continuous carving operation.

The apparatus of FIGURE 5 may be operated in a continuous fashion as follows. The azimuth wheel 87 is turned until the desired azimuth is indicated on scale 90. The elevation wheel 85 is turned continuously, changing the elevation from a low value on elevation scale 83 to a high value, or vice versa. During this continuous motion the operator continuously moves depth wheel 81 both clockwise and counterclockwise as necessary to cause pointer 64 to remain on the proper curved azimuthal line of photographic record 200. During this operation also, the shaft handle 33 is always pressed to its maximum forward position.

The reader will undoubtedly appreciate that, in the continuous operation just described, the end of the carving tool may undergo a predominantly sideways motion rather than an axial motion as in drilling. Therefore, in the continuous process the carving tool must be a milling tool or router bit rather than a simple drill. The continuous process is, of course, capable of achieving greater detail. The detail along the curved line of motion can be as fine as the finite radius of curvature of a milling tool will permit. However, practical considerations determine if and when the continuous process can be used. Milling or routing requires relatively greater motor power. For instance, it is easy to drill into two or three inches of wood with a drill operated by a small fractional horsepower motor, but to rout, even to a depth of an inch, requires a larger motor having of the order of one horsepower. Therefore, if the machine is one of small horsepower, the best course of operation is to remove the bulk of the material using the discrete drilling process, and then to change to the continuous process for refinement of detail. For instance, in the carving of wooden images of human faces, life-sized and smaller, I have found that good detail may be produced using a combination of the discrete and continuous processes with a machine having only about one-tenth horsepower.

The above paragraphs have told how one uses the machine of FIGURE 5, without telling how the machine itself actually works in detail, and why the described external operations must actually produce an accurate three-dimensional image of the prototype. The following paragraphs will explain the main principles of operation and will then describe various parts of the machine and explain some of their interactions.

It may now be noted that the machine of FIGURE 5 just like the simple but impractical machine of FIGURE 4, incorporates spatial relationships similar to those of the recording system. Referring to FIGURE 5, the point 100 corresponds to the point light source of the recording system. The point 180 corresponds to the optical center of the recording camera lens. The photographic record 200 is in the same location relative to the points 100 and 180 that the recording film was in with respect to the point light source and the optical center of the recording lens in the recording system.

The axis of the guide rod 62 goes through the point 180 and meets the photographic record at the end of the pointer 64. The axis of rod 72 goes through point 100 and also intersects the axis of rod 62 at the point 220. Now it can be appreciated that if rod 72 is pointed in the direction taken by one of the identifiable light rays in the recording operation, and if pointer 64 is pointed to the image on the photographic record of the location where that particular light ray met the prototype, then the axes of the pair of rods 72 and 62 are in spatial positions of two light rays in the recording operation, a first light ray proceeding from the point light source to the surface of the prototype and a second light ray proceeding from the location where the first ray met the surface of the prototype, through the optical center of the recording lens, and onto the film where it made an image of the location where the first ray met the surface of the prototype. For such a condition to exist, the point 220 must be in the same spatial position with respect to points 100 and 180 that the location where the first light ray met the prototype was in with respect to the point light source and the optical center of the recording camera lens.

It follows that if rod 72 is pointed in a set of directions each one of which corresponds to the direction of an identifiable light ray in the recording step, and if for each one of those directions, pointer 64 is made to point at the image on the photographic record of the location where the light ray having that direction met the prototype, then point 220 will move about in space describing a surface similar to that of the prototype. Finally, if the entire machine is so arranged that the limiting point to which the carving tool can penetrate the block to be carved follows the same motion in space as does point 220, then the carving tool must carve an image of the prototype. This is, in principle, how the machine of FIGURE 5 operates.

Some of the mechanical details of the operation of the machine represented in FIGURE 5 will be described now. The main body of the machine is mounted on a horizontal base plate 79 that rests on table 77. All of the parts mounted on plate 79 rotate together about a vertical axis 75 which goes through the base near its rear center. The rotation is produced by azimuth wheel 87 which turns azimuth screw 89. The rotation is measured by azimuth pointer 88 and azimuth scale 90. The carving tool 36 is mounted in motor 34 which slides on motor track 35. The common axis of tool 36, motor 34, and its attached shaft 33 goes through point 37, which is on vertical axis 75. The motor track is suspended from a bearing that permits rotation about a horizontal axis through point 37. The motor track is raised and lowered by rotating the elevation wheel 85, which rotates the elevation screw 73. The raising of the motor track elevates the carving tool axis, always, however, leaving that axis so that it goes through point 37. The elevation of the carving tool axis is measured on elevation scale 83.

The motor can be slid backward and forward along track 35 between two possible extreme positions, the extreme rearward position being reached when stop 31 butts back against support column 54, and the extreme forward position being reached when stop 31 butts against stopper bar 82. The extreme forward position is variable by moving the stopper bar 82 backward and forward. This is accomplished by rotating the depth wheel 81 which is attached to the depth screw 80. In the particular machine of FIGURE 5, the verticality of the stopper bar is maintained during any backward or forward motion by a parallel screw 91 that rotates identically with screw 80 because it is driven by a mate wheel 92, mated to depth wheel 81 by the belt around the two wheels. (In actual practice the two wheels 81 and 92 are preferably sprocket wheels connected by a chain, but a belted arrangement is clearer in the drawing.)

The next part of the description will explain how the depth control is related to the photographic record. Above the motor track and parallel to it is the supporting track 78 for the rod 72, which we shall call the parallel rod 72, the adjective parallel referring to the fact that the axis of the parallel rod is always parallel to the carving tool axis. The parallel rod track 78 is supported in the main support column 54 at the bearing 76, whose horizontal axis intersects the main vertical axis 75 at the point 100. The parallel rod track 78 is connected to the motor track 35 by a vertical connector rod 71, which causes the parallel rod track to elevate when the motor track elevates, and thereby maintains the parallelism. Because rod track 78 is mounted in column 54 just as motor track 35 is mounted, it must undergo exactly the same azimuthal motions as motor track 35, and because of connecting rod 71 it must undergo exactly the same elevational motions as motor track 35. Therefore, when the motor axis, or carving tool axis, of the particular machine of FIGURE 5 is pointed in a given direction defined by an azimuth and an elevation, parallel rod track 72 is necessarily pointed in exactly the same direction. Or, in other words, the azimuth readings on scale 90 and the elevation readings on scale 83 apply as well to the axis of parallel rod 72 as to the carving tool axis.

The remaining feature to explain in order that the depth control may be understood is the detailed action of the stops 84 and 86 on parallel rod 72. Stop 84 is firmly fixed to parallel rod 72 by a set screw, but the set screw can be loosened to adjust the axial position of stop 84. Stop 86 is loose on parallel rod 72, but is always pressed by a spring against stopper bar 82 on the side opposite to stop 84, the other end of the spring being fixed to parallel rod 72 by the collar 69. Because parallel rod 72 has no other axial constraint, that is, it moves freely in the sliding bearing 74 and in a similar bearing within column 54, not visible in FIGURE 5, the spring-activated stop 86 actually causes parallel rod 72 always to press forward so that stop 84 presses against stopper bar 82, and the position of parallel rod 72 in the axial direction is determined entirely by the position of stopper bar 82. This means, of course, that it is controlled solely by stopper bar 82 in any one set of sculpturing operations, in which the stop 84 is set-screwed to parallel rod 72 in a constant place. If it is desired to change the position that parallel rod 72 will assume for any given position of stopper bar 82, the change is, of course, possible through changing the position of stop 84 on parallel rod 72.

Just as for any given position of stopper bar 82, the position in the axial direction of parallel rod 72 can be adjusted by set-screwing stop 84 in the desired place, for any given position of stopper bar 82, the extreme forward position of the carving tool can be adjusted by set-screwing stop 31 in the desired place. Therefore, the combined adjustment of the two stops 84 and 31 determines the relative position of the point 220, the effective forward end of parallel rod 72, with respect to the penetrating extremity of the carving tool 39. Although it is not the only useful relative position, the usually desirable relative position of the extreme forward position of the penetrating extremity of the carving tool 39 with respect to point 220 is directly under it vertically. Described otherwise, this relative position is such that when the carving tool is in its extreme forward position, the distance from its penetrating extremity 39 back to the vertical axis 75 is the same as the distance from point 220 back to vertical axis 75.

Now explanations have been given of detailed mechanical motions that cause the point to which the carving tool can penetrate to follow the same spatial movements as the point 220. An explanation was given hereinbefore which led to the conclusion that if the limiting point to which the carving tool can penetrate the block to be carved follows the same motion in space as does point 220, then the carving tool must carve an image of the prototype. Therefore, the operation of the machine of FIGURE 5 has now been explained, both in principle and in terms of detailed interactions of the various mechanical parts.

In the above explanation of the operation of the machine represented in FIGURE 5, a tacit assumption has been made that the information necessary to make the desired image is all contained on the photographic record 200. In the usual case, it is impossible to get all the necessary information on one record. It is necessary to take two or more photographs from different angles. In the carving of facial portraits, for example, at least two photographs are necessary to define both the left and right sides of the face. The usually best procedure is to record from two positions symmetrically placed on opposite sides of the segittal plane of the head. Then when the carving is made, the photographic information from each camera is used in a spatial position corresponding to that from which it was taken. In the machine represented in FIGURE 5, the entire column 56, with its supporting yoke 58 for the guide rod, and its attached record holder 44, can be shifted from the right side of the carving tool support to the left side. The shift is indicated in phantom in FIGURE 5, the axis of column 56 being indicated to be centered in the hole 93. The left side position is mirror-symmetrical to the right side position with respect to the plane of zero azimuth for the carving tool. The guide rod works from the left side position just the same as from the right side position, and all other functions remain the same. In the carving of a face, for instance, the left side position is used for carving the right side of the face, and the right side position shown in FIGURE 5 is used for carving the left side of the face.

Figure 6:
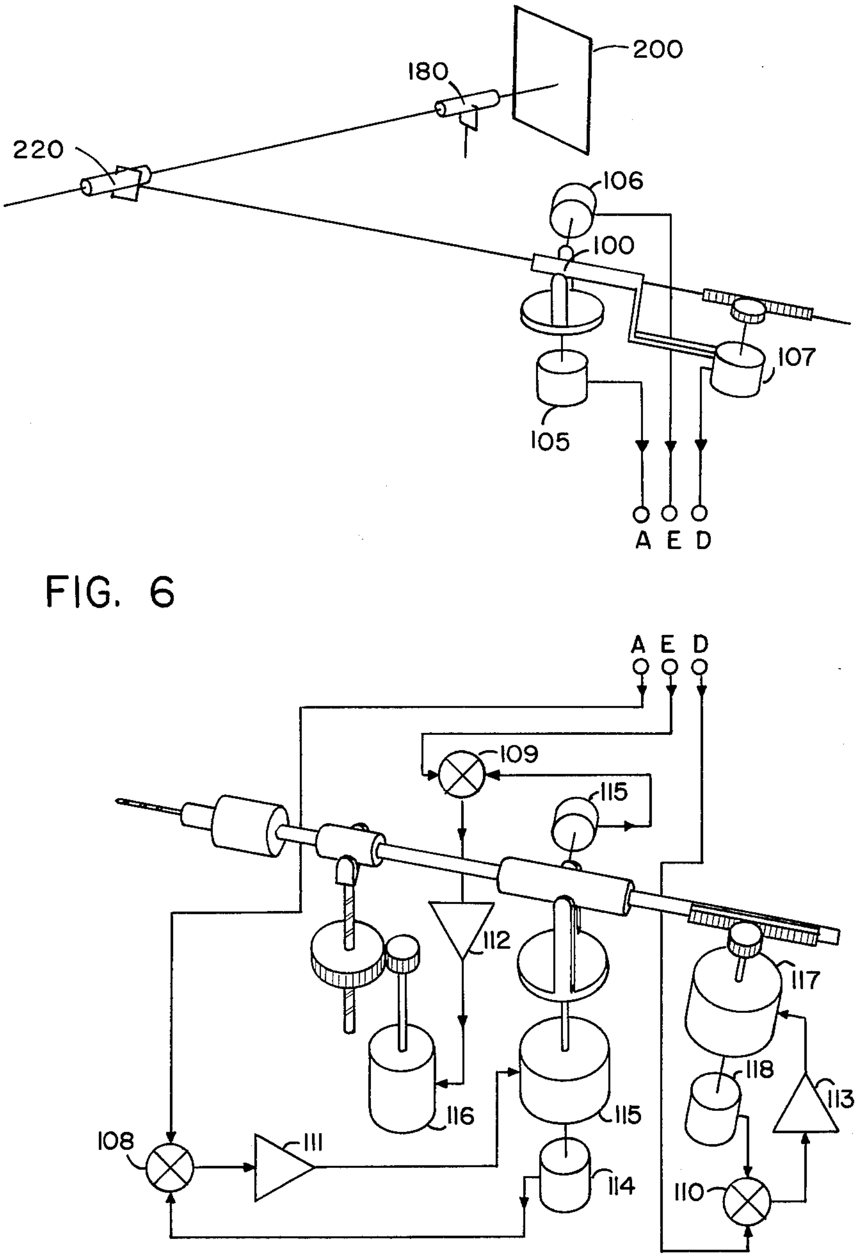
FIGURE 6 is a schematic diagram of another form of carving, or shaping, machine in which the information reading function is geographically separated from the carving, or shaping, function.

Once the principles of operation of the method are understood, it becomes apparent that there are many modifications of the machine of FIGURE 5 that would perform the method. For instance, one might physically separate the means for reading the photographic record from the means for carving the block. FIGURE 6 shows schematically the fundamental parts of a separated machine. In this machine the spatial directions between the points 100, 220, and 180 would be determined from the photographic record just as in the machine of FIGURE 5. However, instead of mechanical linkages between the reading portion and the carving portion of the machine, there would be electrical linkages through which the spatial positions were communicated, say by electrical voltages. The spatial directions between points 100, 220, and 180 would be expressible in terms of an azimuthal angle about a vertical axis through point 100, an elevation angle about a horizontal axis through point 100, and a depth, or axial distance, from point 100. In FIGURE 6, the azimuth is translated into an electrical signal by synchro transmitter 105, and the signal is transmitted to the point A. The elevation is translated into an electrical signal by synchro transmitter 106, and the depth, by synchro transmitter 107. The elevation and depth signals are transmitted to the points E and D, respectively.

The carving or shaping means is represented in the lower part of FIGURE 6. Points A, E, and D on the carving or shaping means correspond to points A, E, and D on the reading means. The space between the similarly labeled points is intended to indicate that the channels through which the azimuth, elevation, and depth information pass may cross any amount of space. The reading and shaping means could be in separate rooms, or separate buildings. Conceivably, the azimuth, elevation, and depth information could be transmitted by radio to a shaping means at a remote location.

Referring to the shaping means in FIGURE 6, the azimuth signal from point A is fed to the error detector 108, which feeds to amplifier 111 a signal proportional to the difference between the signal from the synchro transmitter 105 and that from synchro transmitter 114, which indicates the actual position of the shaft of motor 115. The error detector 108 feeds a signal to amplifier 111, which correspondingly actuates motor 115 until the shaping tool azimuth is correct.

The elevation signal from point E is fed to error detector 109 which feeds to amplifier 112 a signal proportional to the difference between the signal from synchro transmitter 106 and synchro transmitter 115. Amplifier 112 then actuates motor 116 until the shaping tool assumes the proper elevation.

The depth signal from point D is fed to the error detector 110, which feeds to amplifier 113 a signal proportional to the difference between the signals from the synchro transmitters 107 and 118. Amplifier 113 then actuates motor 117 until the shaping tool assumes the proper depth. This completes the description of the operation of the schematic separated machine of FIGURE 6.

An obvious extension of the method described hereinbefore is the carving of scaled images. Referring again to FIGURE 3, it is evident that if the relative spatial positions of the essential points in the carving system are made the same as the relative positions of the essential points in the recording system, a life-sized or natural-sized image will be produced by the method. However, it will usually be desirable to have only the relative directions between the essential points the same in the carving system as in the recording system. Then the image produced will be similar to the protoype in shape but not necessarily in size. For instance, if the mentioned directions are the same in the carving system as in the recording system, but the corresponding distances between the essential points in the carving system are just half of what they were in the recording system, then a half natural-sized image will be produced. In portrait sculpture, it is usually desirable to make half-sized or third-sized images.

It will be appreciated that, in actual practice, it is much more difficult to build a carving machine in which the distances between all essential points can be varied than it is to record in varying dimensions. It is relatively easy to vary the three distances between the point light source (or projector), the prototype, and the recording camera. This is not to imply that there are no subtleties about matching the recording system and the subsequent carving system. There are, but they can be all comprehended under the general requirement that the two systems should be geometrically similar; that is, there should be the same relative directions between corresponding points.

Mention should perhaps be made of one useful modification of the carving system in which it might be said that the operator changes relative scale within part of the carving machine itself without changing the scale of the carved image. When it is desirable to take maximum advantage of all the information on the photographic record without eye strain, one expedient is to enlarge the record, say to two or three times its original size, for the machine and to use the enlarged record in a modified holder. Referring to FIGURE 5, the record holder 44 on the actual machine represented there is suitable for a 4- by 5-inch negative, but holder 44 can be readily removed and replaced by one twice as large that will hold an 8- by 10-inch record. This larger holder is, of course, set twice as far away from point 180 as the regular one; and the spring-operated pointer 64 must be let out to be twice as long as it is in regular use. It will be appreciated, however, that this change is an angle-preserving change, and that it has no effect on the movements of the system on the other side of point 180 away from the record, other than the desired effect of decreasing the error of those movements.

At this point, it seems desirable to mention certain variations of the described photosculpture method that in a narrow sense violate some of the principles of the method that have been taught. In all of the preceding description, one object of the method has been to produce a mathematically exact reproduction of the prototype. That is, the method permits an errorless reproduction of a shape, in any desired scale. However, the same knowledge that makes it possible to produce a distortionless image can also make it possible to produce an intentionally distorted image. Intentional violation of the conditions for exact reproduction produces intentional distortions, some of which are useful, or, at least, desirable.

In certain types of statuary it is desirable to have proportions somewhat different from those of normal human beings. For instance, there are so-called "fashion" proportions and "heroic" proportions (Loomis: "Figure Drawing for All It's Worth," Viking Press, New York, 1944, pp. 26–28). In these sets of proportions there are variations in the relative sizes of various parts of the body. One of the chief characteristics of a set of proportions is the ratio of over-all height to width. Everyone is familiar, for instance, with the relative thinness, or tallness, of the usual fashion drawing. For purposes of this specification, the problem may be considered of changing the ratio of over-all height to width in a full figure statue. Assume that the prototype is a human and that the image is desired to represent the human, but in elongated form. Assume that the ratio of over-all height to width for the image is to be four-thirds of the true ratio for the human prototype. One way to produce such an image is to distort the photographic record intentionally, for example, by enlarging it with an anamorphic lens, so that the height-to-width ratio will be four-thirds of the original ratio. Then the distorted record may be put into the record holder of a machine like that of FIGURE 5. The carving operation may then be carried out as described hereinbefore, except for one important difference. In the previous description, two of the required three dimensions, the azimuth and the elevation, were set on the carving tool side of the machine, and the third dimension, the depth, was then set using the photographic record. In the production of an elongated image where the width of the photographic record is what it would have been for a normal-sized image but the length is abnormal, it is convenient to set only one dimension, the azimuth, on the carving tool side of the machine, and both of the remaining two dimensions, the elevation and the depth, from the photographic record.

If purposeful distortions are introduced into both the horizontal and vertical dimensions, the three dimensions must be set in more complicated ways than have been described. The necessary changes of procedure may be worked out if one is familiar with the principles of operation of the method as a whole, but they are too rarely used to justify further detailing here in this specification. Description of all the possible types of linear and nonlinear distortion that may be purposefully introduced would constitute a major digression.

In distortionless photosculpture, various axes of a photosculpture machine, such as the one represented in FIGURE 5, are pointed in the same relative directions in space as the corresponding light rays in the recording process. However, in distortional photosculpture, those same axes are pointed in sets of directions that may diverge from, or converge toward, each other more than the corresponding directions in the recording process. It is for this reason that in the claims at the end of this specification the axes of the carving or shaping tool are stated to be set in directions corresponding to directions of light rays in the recording step, but not necessarily directions are are identically the same as those of light rays in the recording step.

The above discussion of purposeful distortions has brought out one point of general important that should be further amplified. It was mentioned that in the production of undistorted images there is some arbitrariness about the way in which the dimensions are set. For instance, when the hole-drilling technique is being used, one can set the azimuth on the carving tool side of the machine and get both the elevation and the depth from the photographic record, or one can set both the azimuth and the elevation on the carving tool side of the machine and get only the depth from the photographic record. There is a redundancy of one dimension in the method. Two dimensions are settable on the carving tool side of the machine, and two dimensions may be read off the photographic record, making four dimensions in all, one of them being redundant. It turns out that this redundancy may be eliminated with some ensuing advantages in the production of undistorted images. Mathematical analysis shows that in the method as described hereinbefore in which the azimuth and elevation of the carving tool axis are set to match the azimuth and elevation of an original identifiable light ray projected onto the prototype, if the carving system is truly geometrically matched to the recording system, there is no useful information in the approximately horizontal lines of a photographic record such as the one shown in FIGURE 2. All of the depth information is in the approximately vertical lines. Therefore, the approximately horizontal lines may even be left off the record. Or, in other words, the original recording step may be done with a one-dimensional grid having only vertical lines. This makes a simpler, less confused record that is much easier to use when it is applicable. It is easier to use particularly in the continuous type of operation described hereinbefore, in which the operator continuously adjusts depth so as to maintain the pointer on one proper line of photographic record.

Another advantage of this type of record is that the absence of crossing lines makes it easier to use a photoelectric curve follower, or some other curve tracing device, on the record lines, in case it is desired to automate a machine like the one shown in FIGURE 5.

It is apparent that there are many refinements that could be added to the machine represented in FIGURE 5 to make it more convenient, or more automatic, without changing its principles of operation. For example, the mechanical smoothness of operation is improved by replacing the spring operated pointer 64 with a light ray pointer that merely shines a spot of light on the proper portion of the photographic record. The present specification does not dwell on such refinements, because, as stated near the beginning, one of the objects of the present invention is to provide a method and apparatus not involving complicated electromechanical, or electronic, parts.

In the claims to follow, for brevity in describing the recording step, mention is made of light rays being projected from a point in space. This language is intended to cover both the case in which the light rays actually originate at that point in space, and the case in which they originate somewhere else, as in a projector, and behave as if they came through that point in space, which is then the optical center of a projector lens system. In either case, it seems proper to speak of the rays on the prototype side of the point as coming from that point.

I claim:

1. The method of photosculpturing a three-dimensional image of a three-dimensional prototype comprising:

(a) projecting upon the prototype a grid composed of light rays diverging three-dimensionally from a first point of known location, (b) instantaneously recording a two-dimensional photographic image of the three-dimensional surface of intersection of said grid and said prototype, using light rays reflected by said prototype, said reflected light rays converging through the effective optical center of a camera lens, said center being at a second point of known location outside the cone of rays from said first point that is subtended by said prototype, (c) placing a tool-constraining point at a position corresponding to that of said first point in step (a), (d) placing a tool-sighting point at a position corresponding to that of said second point in step (b), (e) placing the recorded photographic image at a position corresponding to the position it occupied during its recording in step (b), (f) placing a block of material to be carved at a position corresponding to that of said prototype in step (b), (g) carving into said block with a carving tool by directing said tool so that the direction from said tool-constraining point to the penetrating extremity of said tool corresponds to the direction of one of said light rays in step (a), said one of said light rays being identified by its position in said grid, (h) simultaneously with step (g), aligning said penetrating extremity, said tool-sighting point, and the photographic image of the intersection of said one of said light rays with the prototype, and (i) repeating steps (g) and (h) for a plurality of said ones of said light rays, so that said penetrating extremity of said carving tool carves at least part of said block into a three-dimensional image of at least part of said three-dimensional prototype.

2. The method of photosculpturing a three-dimensional image of a three-dimensional prototype comprising:

(a) projecting upon the prototype a grid composed of light rays diverging three-dimensionally from a first point of known location, (b) instantaneously recording a two-dimensional photographic image of the three-dimensional surface of intersection of said grid and said prototype, using light rays reflected by said prototype, said reflected light rays converging through a second point of known location outside the cone of rays from said first point that is subtended by said prototype, (c) setting up a system of bipolar co-ordinates, with a first pole at a position corresponding to that of said first point in step (a), a second pole at a position corresponding to that of said second point in step (b), and with the developed photographic image in a position with respect to said first and second poles geometrically similar to the position said photographic image previously occupied with respect to said first and second points in step (b), (d) constraining the motion of a physical member so that the direction from said first pole to a particular point on said member corresponds to the direction of one of said light rays projected upon said prototype, said one of said light rays being identified by its position in said grid, (e) further constraining the motion of said physical member so that said particular point on said member is aligned both with said second pole and with the point on said photographic image representing the intersection of said one of said light rays with the prototype, (f) repeating steps (d) and (e) for a plurality of said ones of said light rays, so that said particular point on said physical member is caused to assume a plurality of positions in space corresponding to intersections of said ones of said light rays with the prototype, and (g) following the spatial motions in step (f) of said particular point on said physical member with corresponding spatial motions of the penetrating extremity of a carving tool within a block of material to be carved, so that at least part of said block is carved into a three-dimensional image of at least part of said three-dimensional prototype.

3. The method of photosculpturing a three-dimensional image of a three-dimensional prototype, using a photographic image of the surface of intersection with said prototype of a grid composed of light rays diverging three-dimensionally from a first point of known location, and projected upon said prototype, said photographic image having been made using light rays reflected from said prototype and then converging through a second point of known location outside the cone of rays from said first point that is subtended by said prototype, comprising:

(a) setting up a system of bipolar co-ordinates, with a first pole at a location corresponding to that of said first point, a second pole at a position corresponding to that of said second point, and with the developed photographic image in a position with respect to said first and second poles geometrically similar to the position said photographic image previously occupied with respect to said first and second points,
(b) constraining the motion of a physical member so that the direction from said first pole to a particular point on said member corresponds to the direction of one of said light rays projected upon the prototype, said one of said light rays being identified by its position in said grid,
(c) simultaneously constraining the motion of said physical member so that said particular point on said member is aligned both with said second pole and with the point on said photographic image representing the intersection of said one of said light rays with the prototype,
(d) repeating steps (b) and (c) for a plurality of said ones of said light rays so that said particular point on said physical member is caused to assume a plurality of positions in space corresponding to intersections of said ones of said light rays with the prototype, and
(e) following the spatial motions in step (d) of said particular point on said physical member with corresponding spatial motions of the penetrating extremity of a carving tool within a block of material to be carved, so that at least part of said block is carved into a three-dimensional image of at least part of said three-dimensional prototype.

4. The method of claim 3 in which said particular point on said physical member is identical with said penetrating extremity of said carving tool.

5. The method of claim 3 in which the spatial motions of said particular point on said physical member are followed with corresponding motions of the penetrating extremity of a separate carving tool in another portion of space, the motions of said particular point and said penetrating extremity being connected by a linkage.

6. The method of claim 5 in which said linkage is mechanical.

7. The method of claim 5 in which said linkage is through electrical signaling means.

8. The method of photosculpturing a block of material into a three-dimensional image of a three-dimensional prototype, in which method the penetrating extremity of the actual carving tool is embedded in said block so that optical and mechanical sighting upon said penetrating extremity is impossible, comprising:

(a) projecting upon the prototype a grid composed of light rays diverging three-dimensionally from a first point of known location,
(b) instantaneously recording a two-dimensional photographic image of the three-dimensional surface of intersection of said grid and said prototype, using light rays reflected by said prototype, said reflected light rays converging through a second point of known location outside the cone of rays from said first point that is subtended by said prototype,
(c) placing a substitute-tool-constraining point at a position corresponding to that of said first point in step (a),
(d) placing a substitute-tool-sighting point at a position corresponding to that of said second point in step (b),
(e) placing the recorded photographic image at a position corresponding to the position it occupied during its recording in step (b),
(f) constraining a substitute-too-extremity to move so that the direction from said substitute-tool-constraining point to the substitute-tool-extremity corresponds to the direction of one of said light rays in step (a), said one of said light rays being identified by its position in said grid,
(g) simultaneously with step (f), aligning said substitute-tool-extremity, said substitute-tool-sighting point, and the photographic image of the intersection of said one of said light rays with said prototype,
(h) repeating steps (f) and (g) for a plurality of said ones of said light rays, so that said substitute-tool-extremity moves to a plurality of positions in space corresponding to the positions of points of intersection of a plurality of said light rays with said prototype, and
(i) following in another volume of space, the motions of said substitute-tool-extremity with the motions of the penetrating extremity of an actual carving tool so that the motions of said substitute-tool-extremity in steps (f) through (h) are duplicated in said other volume of space, which volume of space is occupied by a block of material to be carved, and so that said penetrating extremity is guided to carve at least part of said block into a three-dimensional image of at least part of said three-dimensional prototype.

9. The method of photosculpturing a block of material into a three-dimensional image of a three-dimensional prototype, in which method the penetrating extremity of the actual carving tool is embedded in said block so that optical and mechanical sighting upon said penetrating extremity is impossible, and in which method use is made of a photographic image of the surface of intersection with said prototype of a grid composed of light rays diverging three-dimensionally from a first point of known location, said photographic image having been made using light rays reflected from said prototype then converging through a second point of known location outside the cone of rays from said first point that is subtended by said prototype, comprising:

(a) placing a substitute-tool-constraining point at a position corresponding to that of said first point,
(b) placing a substitute-tool-sighting point at a position corresponding to that of said second point,
(c) placing the developed photographic image at a position corresponding to the position it occupied during its exposure,
(d) constraining a substitute-tool-extremity to move so that the direction from said substitute-tool-extremity corresponds to the direction of one of said light rays, said one of said light rays being identified by its position in said grid,
(e) simultaneously with step (d), aligning said substitute-tool-extremity, said substitute-tool-sighting point, and the photographic image of the intersection of said one of said light rays with said prototype,
(f) repeating steps (d) and (e) for a plurality of said ones of said light rays, so that said substitute-tool-extremity moves to a plurality of positions in space corresponding to the positions of points of intersection of a plurality of said light rays with said prototype, and
(g) following in another volume of space, the motions of said substitute-tool-extremity with the motions of the penetrating extremity of an actual carving tool so that the motions of said substitute-tool-extremity in steps (d) through (f) are duplicated in said other volume of space, which volume of space is occupied by a block of material to be carved, and so that said penetrating extremity is guided to carve at least part of said block into a three-dimensional image of at least part of said three-dimensional prototype.

10. A method of photosculpture in which a grid is projected onto a prototype from a fixed point source of light rays, said rays being identifiable by their azimuths and elevations, said azimuths being referred to a vertical axis and a vertical plane through said fixed point source, and said elevations being referred to a horizontal axis and a horizontal plane through said fixed point source, said azimuths and elevations also corresponding to identifiable points of said grid, and in which method a photograph is taken of the meeting points of said identifiable light rays with the surface of said prototype, said photograph being taken through the effective optical center of a camera lens at a second known fixed location, and in which method the geometry of the subsequent carving process is made to simulate the geometry of the prior photographing process, comprising:

(a) placing said photograph in a position with respect to a first fixed spatial point and a second fixed spatial point, which position is geometrically similar to the position that the negative of said photograph previously occupied with respect to said point source and said effective optical center respectively, (b) constraining the motion of a movable terminal point so that it has an azimuth and an elevation with respect to said first fixed spatial point that correspond respectively to the azimuth and elevation of an identified one of said light rays in the prior recording process, (c) controlling the distance of said movable terminal point from said first fixed spatial point so that a straight line from said terminal point passing through said second fixed spatial point passes through the image of the meeting point of said identified one of said light rays on said photograph, (d) repeating the preceding two steps a plurality of times for a plurality of different identified ones of said light rays having various azimuths and elevations, so that said terminal point is caused to assume a plurality of different spatial positions having the same relative configuration as points on the surface of said protype, (e) following the motion of said terminal point with a corresponding motion of the penetrating extremity of a carving tool, the motions of said terminal point and said penetrating extremity being in different volumes of space, and (f) carving a stationary block of material with said penetrating extremity during said corresponding motion, whereby said block is shaped into a three-dimensional image of at least part of said prototype.

11. A method of carving the three-dimensional image of a prototype, in which method the three dimensions specifying the location of the penetrating extremity of the carving tool are an azimuth, an elevation, and a depth, said azimuth being referred to a vertical axis and a vertical plane through a fixed first spatial point exterior to a block of material to be carved, said elevation being referred to a horizontal axis and a horizontal plane through the same said fixed first spatial point, and said depth being measured radially from the same said fixed first spatial point, comprising:

(a) projecting a grid onto the prototype from a fixed point source of light rays, (b) identifying said rays by their azimuths and elevations, said azimuths being referred to a vertical axis and a vertical plane through said fixed point source and said elevations being referred to a horizontal axis and a horizontal plane through said fixed point source, said azimuths and altitudes also corresponding to identifiable meeting points of said rays with the surface of said prototype, (c) photographing said prototype with a still camera, the effective optical center of the lens of said camera being at a second fixed location, (d) placing said photograph in a position with respect to a first fixed spatial point and a second fixed spatial point, which position is geometrically similar to the position that the negative of said photograph previously occupied with respect to said point source and said effective optical center respectively, (e) constraining the motion of a movable terminal point so that it has an azimuth and an elevation with respect to said first fixed spatial point that correspond respectively to the azimuth and elevation of an identified one of said light rays in the prior recording process, (f) controlling the distance of said movable terminal point from said first fixed spatial point so that a straight line from said terminal point passing through said second fixed spatial point passes through the image of the meeting point of said identified one of said light rays on said photograph, (g) repeating the preceding two steps a plurality of times for a plurality of different identified ones of said light rays having various azimuths and elevations, so that said terminal point is caused to assume a plurality of different spatial positions having the same relative configuration as points on the surface of said prototype, (h) following the motion of said terminal point with a corresponding motion of the penetrating extremity of a carving tool, the motions of said terminal point and said penetrating extremity being in different volumes of space, and (i) carving a stationary block of material with said penetrating extremity during said corresponding motion, whereby said block is shaped into a three-dimensional image of at least part of said prototype.

12. A method of photosculpture in which the three-dimensional motion of the carving tool is determined in a system of bipolar co-ordinates geometrically similar to the natural bipolar co-ordinates of the prior photographic recording system, one of the poles of said system corresponding to a fixed point source of light rays from which a grid containing a two-dimensional plurality of identifiable points was projected over an extended area of the surface of a three-dimensional prototype, and the other pole of said bipolar system corresponding to a fixed effective optical center of a camera lens through which a photograph was made of the distortions of said grid by said extended area of said surface of said prototype, the method comprising:

(a) placing said photograph in a position fixed with respect to a first fixed spatial point, which position is geometrically similar to the position that the film of said photograph occupied with respect to said point source of light rays, (b) simultaneously placing said photograph in a position with respect to a second fixed spatial point, which position is geometrically similar to the position that the negative of said photograph occupied with respect to said effective optical center of said camera lens, so that the resulting spatial configuration of said photograph, said first fixed point, and said second fixed point is geometrically similar respectively to the original spatial configuration of said negative, said point source of light rays, and said effective optical center of said camera lens, (c) constraining the three-dimensional motion of a terminal point so that its direction in space from said first fixed point corresponds to the direction in space taken by an identifiable light ray from said point source toward said prototype, said identifiable light ray uniquely corresponding to an identified one of said points of said grid, (d) simultaneously constraining said three-dimensional motion of said terminal point so that the direction in space from said terminal point to said second fixed point corresponds to the direction from the meeting point of said identifiable light ray with said surface of said prototype toward said effective optical center of said camera lens, (e) repeating the above steps, (c) and (d), for a plurality of other identifiable light rays, (f) following said three-dimensional motion of said terminal point with a corresponding three-dimensional motion, in another region of space, with the penetrating extremity of a carving tool, and (g) placing a block of material in a fixed position in said other region of space in which is occurring said three-dimensional motion of said penetrating extremity, whereby said penetrating extremity carves at least a part of a three-dimensional image of said prototype.

13. Apparatus for carving a block of material to reproduce the shape of a three-dimensional prototype from a photograph of said prototype showing identifiable light rays projected upon said prototype from a fixed effective point source, said identifiable rays meeting the surface of said prototype in a three-dimensional array of identifiable meeting points, the images of said meeting points being recorded by means of light rays proceeding from said meeting points through a fixed effective optical center of a recording camera lens, said apparatus comprising:

(a) means for holding said photograph in a fixed position with respect to a first fixed spatial point and a second fixed spatial point, which position is geometrically similar to the position that the original negative of said photograph occupied with respect to said fixed effective point source and said fixed effective optical center, respectively, (b) means for constraining a movable member so that the direction from said first fixed spatial point toward a terminal point of said movable member corresponds to the direction in which one of said identifiable light rays proceeded from said fixed effective point source toward its meeting point with the surface of said prototype, (c) means for further constraining the same said movable member so that the direction from said terminal point of said movable member toward said second fixed spatial point corresponds to the direction in which the image-forming light ray proceeded from said meeting point toward and through said fixed effective optical center and onto said photographic record to record the image of said meeting point on said record, (d) a carving tool having a penetrating extremity, (e) means for following the spatial motion of said terminal point with a corresponding motion of said penerating extremity of said carving tool, whereby said penerating extremity is caused to occupy a series of points in space whose relative positions correspond to relative positions of meeting points of said identifiable light rays with said prototype surface, and (f) means for positioning said block so as to be penetrated by said penetrating extremity during said corresponding motion of said tool.

14. Apparatus for carving a block of material to reproduce the shape of a three-dimensional prototype from a photograph of said prototype showing identifiable light rays projected upon said prototype from a fixed effective point source, said identifiable rays meeting the surface of said prototype in a three-dimensional array of identifiable meeting points, the images of said meeting points being recorded by means of light rays proceeding from said meeting points through a fixed effective optical center of a recording camera lens, said apparatus comprising:

(a) means for holding said photograph in a fixed position with respect to a first fixed spatial point and a second fixed spatial point, which position is geometrically similar to the position that the original negative of said photograph occupied with respect to said fixed effective point source and said fixed effective optical center, respectively, (b) a rod having an axis that revolves about and translates through said first fixed spatial point, (c) means for pointing said rod in a spatial direction corresponding to the direction of one of said identifiable light rays, (d) means for moving a terminal point on the axis of said rod so that the direction from said terminal point toward said second fixed spatial point corresponds to the direction from the meeting point of said one of said identifiable light rays with said surface of said prototype toward said fixed effective optical center, (e) a carving tool having a penetrating extremity, (f) means for following the spatial motion of said terminal point with a corresponding motion of said penetrating extremity of said carving tool, whereby said penetrating extremity is caused to occupy a series of points in space whose relative positions correspond to relative positions of meeting points of said identifiable light rays with said prototype surface, and (g) means for positioning said block so as to be penetrated by said penertating extremity during said corresponding motion of said tool.

15. Apparatus for carving a block of material to reproduce the shape of a three-dimensional prototype from a photograph of said prototype showing identifiable light rays projected upon said prototype from a fixed effective point source, said identifiable rays meeting the surface of said prototype in a three-dimensional array of identifiable meeting points, the images of said meeting points being recorded by means of light rays proceeding from said meeting points through a fixed effective optical center of a recording camera lens, said apparatus comprising:

(a) means for holding said photograph in a fixed position with respect to a first fixed spatial point and a second fixed spatial point, which position is geometrically similar to the position that the original negative of said photograph occupied with respect to said fixed effective point source and said fixed effective optical center, respectively, (b) a first rod having an axis that revolves about and translates through said first fixed spatial point, (c) a second rod having an axis that revolves about and translates through said second fixed spatial point, (d) means connecting said first and second rods so that their axes always intersect, (e) means for pointing said first rod in a direction corresponding to the direction of one of said identifiable light rays, (f) means for pointing said second rod in a direction corresponding to the photographically recorded direction from the meeting point of said one of said identifiable light rays with the surface of said prototype toward said fixed effective optical center, (g) a carving tool having a penetrating extremity, (h) means for following the spatial motion of the axial intersection of said first and second rods, as said rods are successively pointed in a plurality of directions, with a corresponding motion of said penetrating extremity of said carving tool, whereby said penetrating extremity is caused to occupy a series of points in space whose relative positions correspond to relative positions of said meeting points of said identifiable light rays with said prototype surface, and (i) means for positioning said block so as to be penetrated by said penetrating extremity during said corresponding motion of said tool.

16. Apparatus in accordance with claim 15 in which said first rod and said second rod are slidably connected to each other.

17. Apparatus in accordance with claim 15 in which said penetrating extremity of said carving tool is at a location remote from said intersection of said rods.

18. Apparatus in accordance with claim 17 in which the connection between said intersection of said rods and said tool in said remote location is by a mechanical linkage.

19. Apparatus in accordance with claim 17 in which the connection between said intersection of said rods and said tool in said remote location is by an electrical transmitter and follower system.

No references cited.

WILLIAM W. DYER, Jr., *Primary Examiner.*